US009549422B2

(12) United States Patent
Uchino et al.

(10) Patent No.: US 9,549,422 B2
(45) Date of Patent: Jan. 17, 2017

(54) RADIO BASE STATION

(71) Applicant: NTT DOCOMO, INC., Tokyo (JP)

(72) Inventors: Tooru Uchino, Tokyo (JP); Sadayuki Abeta, Tokyo (JP); Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/424,110

(22) PCT Filed: Aug. 19, 2013

(86) PCT No.: PCT/JP2013/072047
§ 371 (c)(1),
(2) Date: Feb. 26, 2015

(87) PCT Pub. No.: WO2014/034452
PCT Pub. Date: Mar. 6, 2014

(65) Prior Publication Data
US 2015/0312752 A1    Oct. 29, 2015

(30) Foreign Application Priority Data

Aug. 29, 2012    (JP) .................................. 2012-188677

(51) Int. Cl.
*H04W 76/02*    (2009.01)
*H04W 52/24*    (2009.01)
(Continued)

(52) U.S. Cl.
CPC ............. *H04W 76/021* (2013.01); *H04W 8/26* (2013.01); *H04W 16/30* (2013.01); *H04W 52/244* (2013.01); *H04W 76/025* (2013.01)

(58) Field of Classification Search
None
See application file for complete search history.

(56) References Cited

U.S. PATENT DOCUMENTS

2011/0299483 A1* 12/2011 Wu .................... H04L 5/001
370/329
2012/0264477 A1* 10/2012 Araragi ............. H04W 52/0235
455/517

(Continued)

FOREIGN PATENT DOCUMENTS

JP        2011-254480 A    12/2011

OTHER PUBLICATIONS

International Search Report issued in PCT/JP2013/072047 mailed on Oct. 8, 2013 (4 pages).

(Continued)

*Primary Examiner* — Ashley Shivers
(74) *Attorney, Agent, or Firm* — Osha Liang LLP (57) ABSTRACT

Even when a same C-RNTI is allocated to multiple mobile stations in a phantom cell, a collision between the mobile stations UE to which the same C-RNTI is allocated is avoided. A radio base station PhNB#10 according to the present invention is configured to manage a cell #10 (phantom cell) which is formed by linking multiple small cells and includes an allocation unit 11 configured to allocate a same C-RNTI$_{ph}$ to multiple mobile stations UE#1/UE#3 which are separated by at least a predetermined distance in the cell #10.

5 Claims, 6 Drawing Sheets (51) Int. Cl.
*H04W 8/26* (2009.01)
*H04W 16/30* (2009.01)

(56) References Cited

U.S. PATENT DOCUMENTS

2013/0021929 A1\* 1/2013 Kim ...................... H04B 7/024
370/252
2013/0223370 A1\* 8/2013 Larmo ................ H04W 76/021
370/329

OTHER PUBLICATIONS

Written Opinion of the International Searching Authority issued in PCT/JP2013/072047 mailed on Oct. 8, 2013 (3 pages).
NTT DOCOMO, INC.; "Requirements, Candidate Solutions & Technology Roadmap for LTE Rel-12 Onward"; 3GPP Workshop on release 12 and onwards, RWS-120010; Ljubljana, Slovenia; Jun. 11-12, 2012 (27 pages).
ZTE Corporation; "View on 3GPP Rel-12 and beyond"; 3GPP Workshop on release 12 and onwards, RWS-120034; Jun. 12, 2012 (17 pages).
Huawei, HiSilicon; "Additional information in the RLF report"; 3GPP TSG RAN WG2 #79 meeting, R2-123507; Qingdao, China; Aug. 13-17, 2012 (4 pages).
3GPP TS 36.300 V11.2.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Jun. 2012 (201 pages).
Extended European Search Report issued in the counterpart European Patent Application No. 13832521.2, mailed Apr. 26, 2016 (6 pages).

\* cited by examiner

FIG. 5

RADIO BASE STATION

TECHNICAL FIELD

The present invention relates to a radio base station.

BACKGROUND ART

Figure 4:
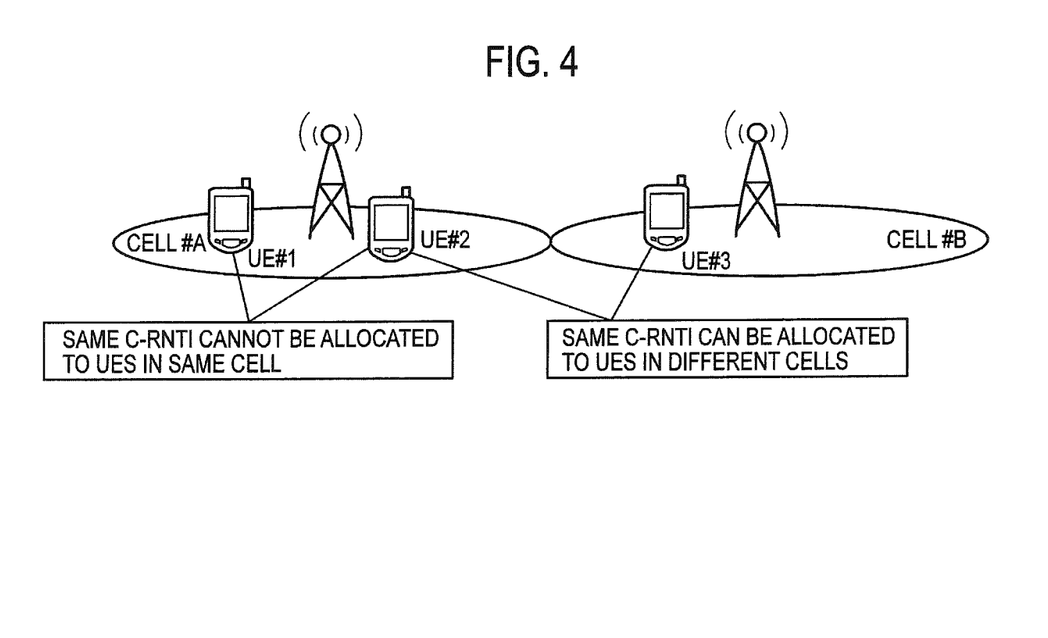
FIG. 4 is a diagram for illustrating a conventional technology.

In LTE (Long Term Evolution), a radio base station eNB is configured to transmit/receive data to and from a mobile station UE performing communications in a cell under the control thereof, with a C-RNTI (Cell-Radio Network Temporary Identifier) allocated to the mobile station UE as illustrated in FIG. 4 (see, Non-patent document 1).

The C-RNTI is allocated on a cell-by-cell basis. In LTE, as illustrated in FIG. 4, a same C-RNTI cannot be allocated to a mobile station UE#1 and a mobile station UE#2 which perform communications in a same cell #A, and a same C-RNTI can be allocated to a mobile station UE#1 (or a mobile station UE#2) and a mobile station UE#3 which perform communications in different cells #A/#B.

Here, the C-RNTI is allocated in "Contention based RA (Random Access) Procedure" or a handover procedure.

In addition, the radio base station eNB is configured to allocate resources for transmitting downlink data and uplink data by using the C-RNTI allocated to the mobile station UE.

Meanwhile, in the "Rel-12 workshop" of the 3GPP, many proposals on "Small cell enhancement" have been made as a topic of FRA (Future Radio Access).

In such proposals, a concept of "Phantom cell" has been discussed.

Figure 5:
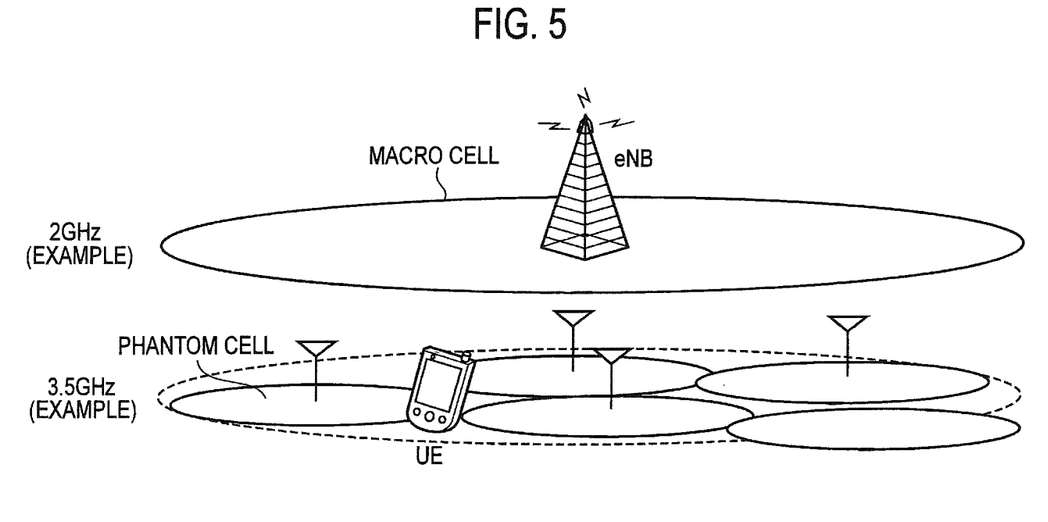
FIG. 5 is a diagram for illustrating a conventional technology.

As illustrated in FIG. 5, unlike a conventional macro cell, a phantom cell can cover a wider area by linking many "small cells" to form one large cell.

PRIOR ART DOCUMENT

Non-Patent Document

Non-patent document 1: 3GPP TS36.300

SUMMARY OF THE INVENTION

Figure 6:
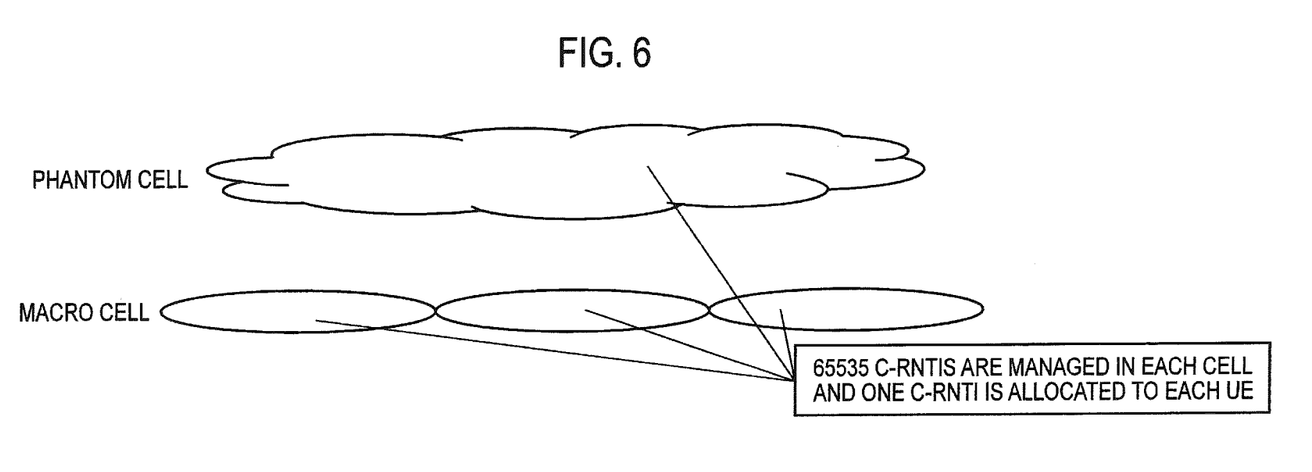
FIG. 6 is a diagram for illustrating a conventional technology.

However, as illustrated in FIG. 6, 65535 C-RNTIs are managed in each cell (a macro cell and a phantom cell), and one C-RNTI has to be allocated to each mobile station UE.

Here, when the coverage area of the phantom cell becomes wider, the number of mobile stations UE performing communications in the phantom cell increases. Accordingly, envisaged is a problem of causing a case in which the phantom cell may run out of C-RNTIs allocatable to the mobile stations UE.

Figure 7:
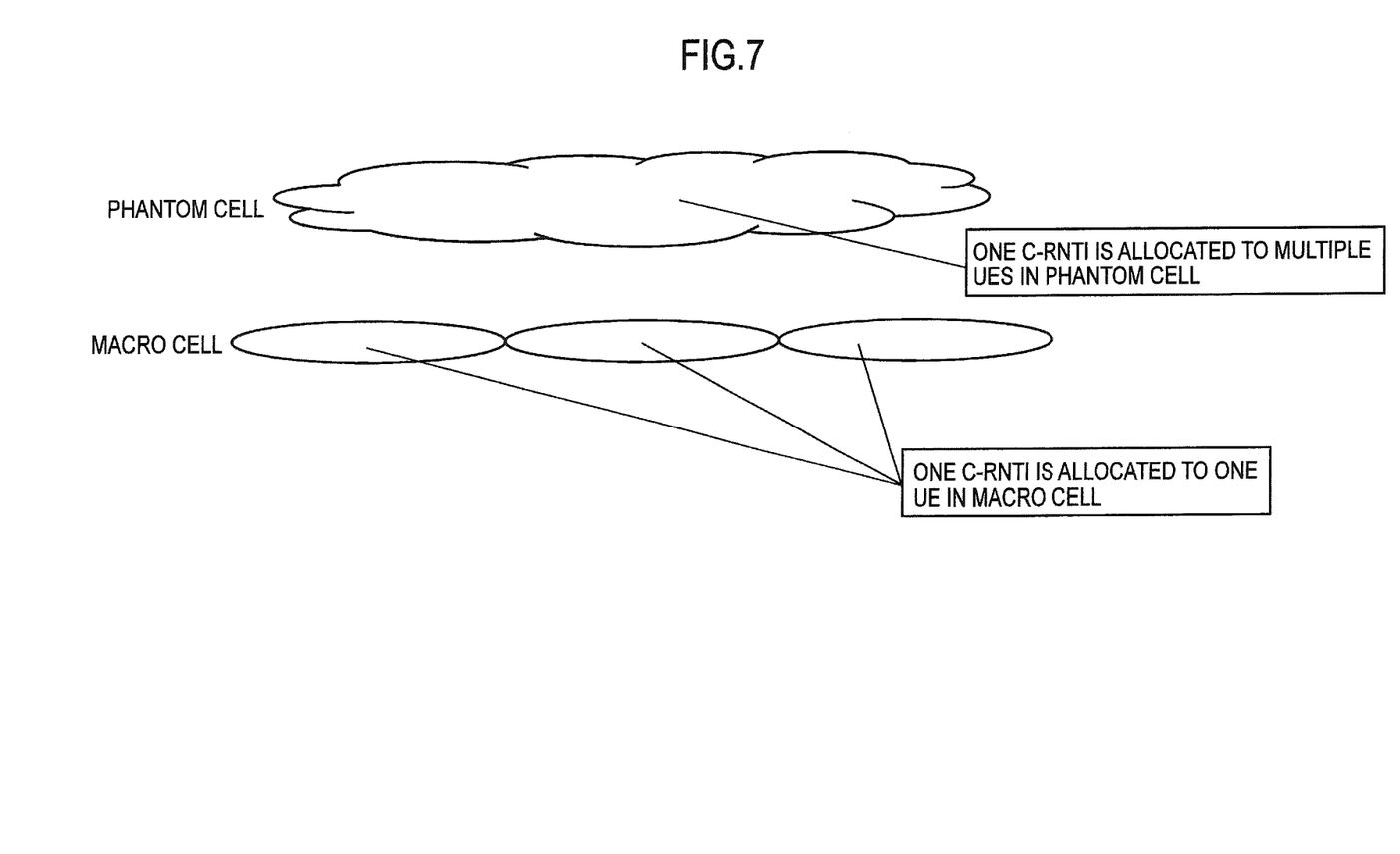
FIG. 7 is a diagram for illustrating a conventional technology.

In a conceivable operation for solving the above-described problem, as illustrated in FIG. 7, one C-RNTI is allocated to each mobile station UE in a macro cell, while one C-RNTI is allocated to multiple (a plurality of) mobile stations UE in a phantom cell (in other words, one C-RNTI is shared between the multiple mobile stations UE).

However, execution of the above-described operation entails a problem that mobile stations UE to which the same C-RNTI is allocated in the same cell may collide with each other. Here, when such a collision occurs, a mobile station UE which is not intended by the radio base station eNB may wrongly receive allocation information for a correct mobile station UE.

For this reason, the present invention is made in view of the above-described problem. Accordingly, an objective of the present invention is to provide a radio base station capable of, even when a same C-RNTI is allocated to multiple mobile stations in a phantom cell, avoiding a collision between the mobile stations UE to which the same C-RNTI is allocated.

A first feature of the present invention is summarized a radio base station configured to manage a phantom cell formed by linking multiple small cells, including: an allocation unit configured to allocate a same cell identifier to multiple mobile stations which are separated by at least a predetermined distance in the phantom cell.

DETAILED DESCRIPTION

Figure 1:
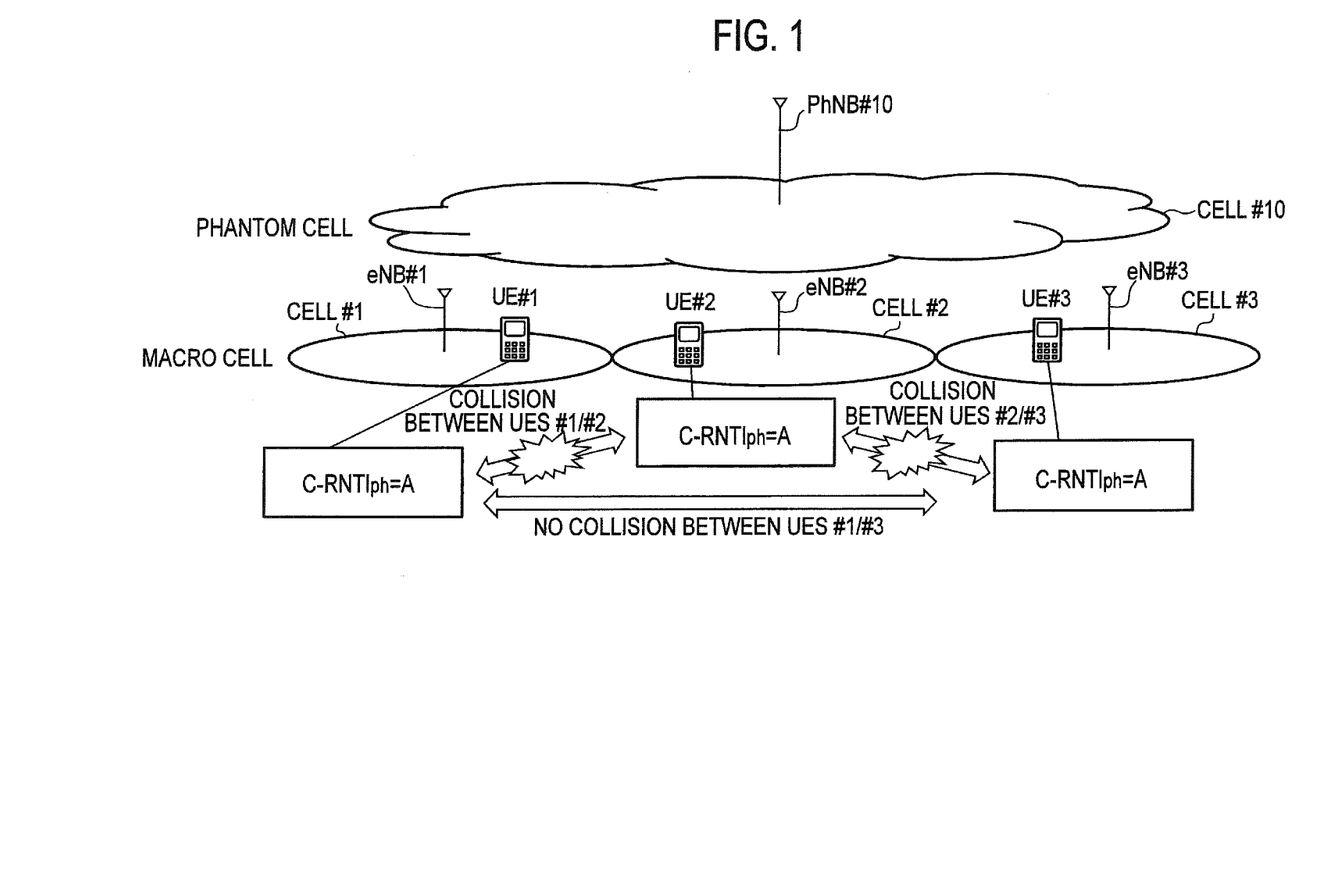
FIG. 1 is an entire configuration diagram of a mobile communication system according to a first embodiment of the present invention.
Figure 2:
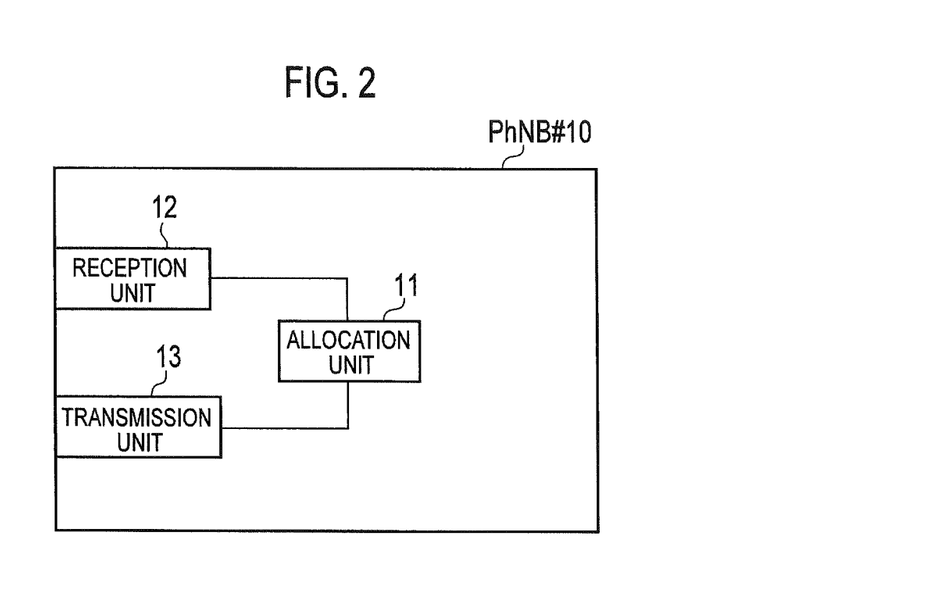
FIG. 2 is a functional block diagram of a radio base station according to the first embodiment of the present invention.
Figure 3:
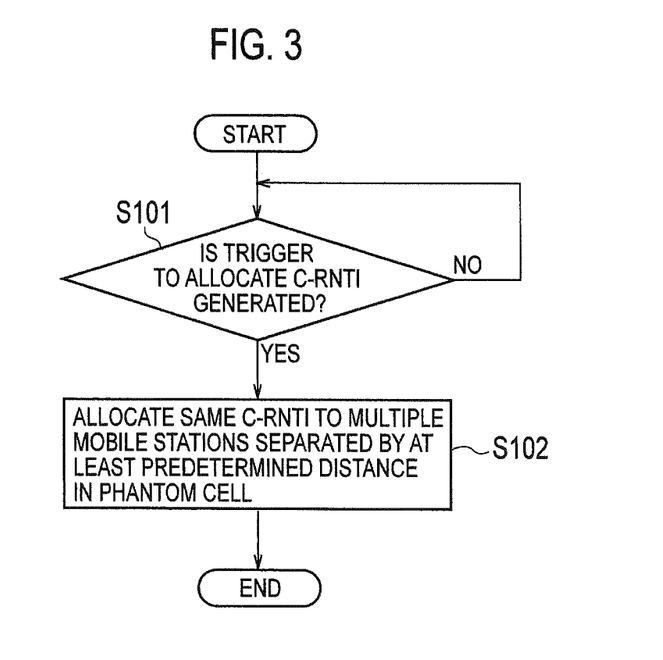
FIG. 3 is a flowchart illustrating an operation of the radio base station according to the first embodiment of the present invention.

Mobile Communication System According to the First Embodiment of the Present Invention Described by referring to FIGS. 1 to 3 is a mobile communication system according to a first embodiment of the present invention.

As illustrated in FIG. 1, a mobile communication system according to the present embodiment is an LTE mobile communication system, which includes a radio base station PhNB#10 configured to manage a cell #10, a radio base station eNB#1 configured to manage a cell #1, a radio base station eNB#2 configured to manage a cell #2, and a radio base station eNB#3 configured to manage a cell #3.

Here, the cell #10 is a phantom cell formed by linking multiple small cells and the cells #1 to #3 are macro cells.

As illustrated in FIG. 1, a coverage area of the cell #10 and coverage areas of the cells #1 to #3 are deployed to at least partially overlap with each other.

As illustrated in FIG. 2, the radio base station PhNB#10 includes an allocation unit 11, a reception unit 12, and a transmission unit 13.

The allocation unit 11 is configured to allocate a C-RNTI$_{ph}$ to each of mobile stations UE#1 to UE#3 in the cell #10.

For example, the allocation unit 11 is configured to allocate a same C-RNTI$_{ph}$ (=A) to the multiple mobile stations UE#1/UE#3 which are separated by at least a predetermined distance from each other in the cell #10.

Here, as illustrated in FIG. 1, when the allocation unit 11 allocates the same C-RNTI$_{ph}$ (=A) to the mobile stations UE#1/UE #2 in the cell #10, a collision occurs between the mobile station UE#1 and the mobile station UE#2.

Accordingly, the allocation unit 11 is configured to allocate different $C\text{-}RNTI_{ph}$ to the mobile stations UE#1/UE#2 in the cell #10.

Similarly, when the allocation unit 11 allocates the same $C\text{-}RNTI_{ph}$ (=A) to the mobile stations UE#2/UE#3 in the cell #10, a collision occurs between the mobile station UE#2 and the mobile station UE#3.

Accordingly, the allocation unit 11 is configured to allocate different $C\text{-}RNTI_{ph}$ to the mobile stations UE#2/UE#3 in the cell #10.

On the other hand, since the mobile station UE#1 is separated by at least the predetermined distance from the mobile station UE#3, a collision does not occur between the mobile station UE#1 and the mobile station UE#3 even when the allocation unit 11 allocates the same $C\text{-}RNTI_{ph}$ (=A) to the mobile stations UE#1/UE#3 in the cell #10.

Here, the allocation unit 11 is configured to grasp location information of the mobile stations UE in the cell #10.

Also, for example, as the predetermined distance, the allocation unit 11 may use the radius of the coverage area of a predetermined cell (for example, the cell #2), may use a mean value, a minimum value, or a maximum value of the radii of the coverage areas of a predetermined number of cells out of the cells #1 to #3 having the coverage areas overlapping with the coverage area of the cell #10, may use a fixed value, or may use a mean value, a minimum value, or a maximum value of the radii of the coverage areas of the small cells forming the cell #10.

Instead, the allocation unit 11 may be configured to perform the above allocation among cells with which mobile stations UE are connected, by referring to the number of cells having coverage areas (which may be small cells forming the cell #10), the number of sectors, or the number of radio base stations eNB.

Furthermore, the allocation unit 11 may be configured to perform the above allocation by considering not only a physical distance between the mobile stations UE, but also the reception characteristic or capability of each mobile station UE or the traffic state of the cell or the state of the radio base station eNB (for example, congestion degree).

Alternatively, the allocation unit 11 may be configured to allocate the same $C\text{-}RNTI_{ph}$ depending on whether or not macro cells with which respective mobile stations UE are connected (or small cells forming a phantom cell) are in different sectors or whether or not radio base stations eNB with which respective mobile stations UE are connected are different radio base stations.

The reception unit 12 is configured to receive various kinds of signals from the mobile stations UE and the radio base stations eNB#1 to eNB#3 in the cell #10. The transmission unit 13 is configured to transmit various kinds of signals to the mobile stations UE in the cell #10 and the radio base stations eNB#1 to eNB#3.

For example, the transmission unit 13 is configured to notify the mobile stations UE in the cell #10 of the $C\text{-}RNTI_{ph}$ allocated by the allocation unit 11.

Hereinafter, referring to FIG. 3, an operation of the radio base station PhNB#10 according to the present embodiment is described.

As illustrated in FIG. 3, when at step S101, the radio base station PhNB#10 detects that a trigger to allocate the $C\text{-}RNTI_{ph}$ to a mobile station UE is generated in the cell #10, at step S102, the radio base station PhNB#10 allocates the same $C\text{-}RNTI_{ph}$ to the multiple mobile stations UE which are separated by at least the predetermined distance from each other in the cell #10.

It is to be noted that at step S102, the radio base station PhNB#10 allocates different $C\text{-}RNTI_{ph}$ to the multiple mobile stations which are not separated by at least the predetermined distance from each other in the cell #10.

The features of the present embodiment may also be expressed as follows.

A first feature of the present embodiment is summarized as a radio base station PhNB# configured to manage a cell #10 (phantom cell) formed by linking multiple small cells, including: an allocation unit 11 configured to allocate a same $C\text{-}RNTI_{ph}$ (cell identifier) to multiple mobile stations UE#1/UE#3 which are separated by at least a predetermined distance in the cell #10.

With the above-described configuration, the same $C\text{-}RNTI_{ph}$ is allocated only to the multiple mobile stations UE#1/UE#3 which are separated by at least the predetermined distance from each other in the cell #10, so that an occurrence of a collision between the mobile station UE#1 and the mobile station UE#3 can be avoided.

In the first feature of the present embodiment, when there are cells #1 to #3 (macro cells) each having a coverage area overlapping with a coverage area of the cell #10, the allocation unit 11 may be configured to allocate a same $C\text{-}RNTI_{ph}$ to multiple mobile stations UE#1/UE#3 which are separated by at least the above predetermined distance set equal to a radius of the coverage area of the cell #2.

With the above-described configuration, the radius of the coverage area of the micro cell is used as the above predetermined distance, so that the collision between the multiple mobile stations UE to which the same $C\text{-}RNTI_{ph}$ is allocated can be more securely avoided.

It is to be noted that the same $C\text{-}RNTI_{ph}$ may be allocated by the macro cell and the phantom cell. At this time, the allocation information of the $C\text{-}RNTI_{macro}$ of the cells #1 to #3 (macro cells) and the allocation information of the $C\text{-}RNTI_{ph}$ of the cell #10 (phantom cell) may be exchanged between the radio base stations eNB#1 to eNB#3 managing the cells #1 to #3 and the radio base station phNB#10 managing the cell #10 (for example, through X2 or S1 interface).

In the first feature of the present embodiment, when there are cells #1 to #3 (macro cells) each having a coverage area overlapping with a coverage area of the cell #10, the allocation unit 11 may be configured to allocate a same $C\text{-}RNTI_{ph}$ to multiple mobile stations UE#1/UE#3 which are separated by at least the above predetermined distance set equal to a radius of a coverage area of the small cells forming the cell #10.

In the first feature of the present embodiment, when there are cells #1 to #3 (macro cells) each having a coverage area overlapping with a coverage area of the cell #10, the allocation unit 11 may be configured to allocate a same $C\text{-}RNTI_{ph}$ to multiple mobile stations UE#1/UE#3 connected with different macro cells as the above predetermined distance.

In the first feature of the present embodiment, when there are cells #1 to #3 (macro cells) each having a coverage area overlapping with a coverage area of the cell #10, the allocation unit 11 may be configured to allocate a same $C\text{-}RNTI_{ph}$ to multiple mobile stations UE#1/UE#3 connected with different radio base stations eNB#1 to eNB#3 managing the cells #1 to #3.

In the first feature of the present embodiment, when there are cells #1 to #3 (macro cells) each having a coverage area overlapping with a coverage area of the cell #10, the allocation unit 11 may be configured to allocate a same C-RNTI$_{ph}$ to multiple mobile stations UE#1/UE#3 connected with macro cells #1 to #3 in different sectors.

It should be noted that the foregoing operations of the mobile stations UE#1/UE#2/UE#3 and the radio base stations eNB#1/PhNB#10 may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile stations UE#1/UE#2/UE#3 and the radio base stations eNB#1/PhNB#10. Otherwise, the storage medium and the processor may be provided as discrete components inside the mobile stations UE#1/UE#2/UE#3 and the radio base stations eNB#1/PhNB#10.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-188677 (filed on Aug. 29, 2012) is incorporated by reference in the present specification.

INDUSTRIAL APPLICABILITY

As described above, the present invention can provide a radio base station that is capable of, even when a same C-RNTI is allocated to multiple mobile stations in a phantom cell, avoiding a collision between the mobile stations UE to which the same C-RNTI is allocated.

EXPLANATION OF REFERENCE NUMERALS eNB#1, PhNB#10 radio base station
11 allocation unit
12 reception unit
13 transmission unit

The invention claimed is:

1. A radio base station configured to manage a cell formed by linking a plurality of small cells, comprising:
a memory; and
an allocation unit configured to allocate a same C-RNTI (Cell Radio Network Temporary Identity) in the cell to a plurality of mobile stations which are separated by at least a predetermined distance in the cell,
wherein when there is a macro cell having a coverage area overlapping with a coverage area of the cell, the allocation unit allocates a same C-RNTI in the cell to a plurality of mobile stations which are separated by at least the predetermined distance set equal to a radius of the coverage area of the macro cell.

2. A radio base station configured to manage a cell formed by linking a plurality of small cells, comprising:
a memory; and
an allocation unit configured to allocate a same C-RNTI (Cell Radio Network Temporary Identity) in the cell to a plurality of mobile stations which are separated by at least a predetermined distance in the cell,
wherein when there is a macro cell having a coverage area overlapping with a coverage area of the cell, the allocation unit allocates a same C-RNTI in the cell to a plurality of mobile stations which are separated by at least the predetermined distance set equal to a radius of a coverage area of the small cells forming the cell.

3. A radio base station configured to manage a cell formed by linking a plurality of small cells, comprising:
a memory; and
an allocation unit configured to allocate a same C-RNTI (Cell Radio Network Temporary Identity) in the cell to a plurality of mobile stations which are separated by at least a predetermined distance in the cell,
wherein when there are a plurality of macro cells each having a coverage area overlapping with a coverage area of the cell, the allocation unit allocates a same C-RNTI in the cell to a plurality of mobile stations connected with different macro cells.

4. A radio base station configured to manage a cell formed by linking a plurality of small cells, comprising:
a memory; and
an allocation unit configured to allocate a same C-RNTI (Cell Radio Network Temporary Identity) in the cell to a plurality of mobile stations which are separated by at least a predetermined distance in the cell,
wherein when there is a macro cell having a coverage area overlapping with a coverage area of the cell, the allocation unit allocates a same C-RNTI in the cell to a plurality of mobile stations connected with different radio base stations managing the macro cell.

5. A radio base station configured to manage a cell formed by linking a plurality of small cells comprising:
a memory; and
an allocation unit configured to allocate a same C-RNTI (Cell Radio Network Temporary Identity) in the cell to a plurality of mobile stations which are separated by at least a predetermined distance in the cell,
wherein when there are a plurality of macro cells each having a coverage area overlapping with a coverage area of the cell, the allocation unit allocates a same C-RNTI in the cell to a plurality of mobile stations connected with macro cells in different sectors.

* * * * *